(12) United States Patent
Buser

(10) Patent No.: US 8,925,714 B1
(45) Date of Patent: Jan. 6, 2015

(54) FEED MECHANISM OF A SMOKE GENERATING DEVICE

(71) Applicant: William J. Buser, Pewaukee, WI (US)

(72) Inventor: William J. Buser, Pewaukee, WI (US)

( * ) Notice: Subject to any disclaimer, the term of this patent is extended or adjusted under 35 U.S.C. 154(b) by 17 days.

(21) Appl. No.: 13/762,143

(22) Filed: Feb. 7, 2013

Related U.S. Application Data

(60) Provisional application No. 61/597,074, filed on Feb. 9, 2012.

(51) Int. Cl.
*B65G 33/14* (2006.01)
*B65G 33/12* (2006.01)
*B65G 33/24* (2006.01)

(52) U.S. Cl.
CPC ..................................... *B65G 33/24* (2013.01)
USPC ............................. 198/660; 198/658; 198/672

(58) Field of Classification Search
USPC ........... 198/467.1, 545, 548, 550.1, 658, 660, 198/672, 673
See application file for complete search history.

(56) References Cited

U.S. PATENT DOCUMENTS

| | | | |
|---|---|---|---|
| 652,531 A | 6/1900 | Carlson | |
| 4,077,527 A * | 3/1978 | Fryer et al. | 414/325 |
| 4,220,242 A * | 9/1980 | Forsberg | 198/666 |
| 4,577,564 A * | 3/1986 | Tomita et al. | 110/110 |
| 4,823,684 A | 4/1989 | Traeger et al. | |
| 5,090,627 A | 2/1992 | Clevenger, Jr. et al. | |
| 5,110,015 A * | 5/1992 | Kilts | 222/413 |
| 5,143,202 A * | 9/1992 | Lehmann et al. | 198/670 |
| 5,263,572 A * | 11/1993 | Hove | 198/672 |
| 5,328,015 A * | 7/1994 | Volk et al. | 198/548 |
| 5,398,814 A * | 3/1995 | Sime | 209/285 |
| 5,709,296 A * | 1/1998 | Forsberg | 198/658 |
| 5,715,976 A * | 2/1998 | Kautz | 222/413 |
| 6,206,177 B1 * | 3/2001 | Broten | 198/672 |
| 6,223,737 B1 | 5/2001 | Buckner | |
| 6,244,388 B1 * | 6/2001 | Yun | 184/63 |
| 6,533,105 B1 | 3/2003 | Dutschke | |
| 6,722,491 B2 * | 4/2004 | Forsberg | 198/658 |
| 6,763,932 B2 | 7/2004 | Stenson et al. | |
| 7,900,553 B1 | 3/2011 | Maurin | |
| 7,976,259 B2 * | 7/2011 | Craig et al. | 414/218 |

\* cited by examiner

*Primary Examiner* — Douglas Hess
(74) *Attorney, Agent, or Firm* — Brannen Law Office, LLC

(57) ABSTRACT

The present invention relates to an improved feed mechanism of a smoke generating device, and in particular to a feed mechanism having an adjustable auger that allows smoke generating materials of selected sizes to fall from a deposit tube in an improved manner. According to one advantage of the present invention, the feed mechanism has a bin with opposed sides, the first of which having a smokehouse mount with an air hole therein and the second side having a motor mount thereon. A tube extends from the smokehouse mount. An auger is adjustably received within the tube to advance material from the bin to a hole in the tube at the opposite end of the auger. Bearings are provided for allowing the height of the auger within the tube to be adjusted to accommodate smoking materials of a selected size.

20 Claims, 5 Drawing Sheets

FEED MECHANISM OF A SMOKE GENERATING DEVICE

This United States utility patent application claims priority on and the benefit of provisional application 61/597,074 filed Feb. 9, 2012, the entire contents of which are hereby incorporated herein by reference.

BACKGROUND OF THE INVENTION

1. Field of the Invention

The present invention relates to an improved feed mechanism of a smoke generating device, and in particular to a feed mechanism having an adjustable auger that allows smoke generating materials of selected size to fall from a deposit tube in an improved manner.

2. Description of the Related Art

It is desirable to smoke many foods and food products. While it is desirable to hold temperatures low and constant temperature (example 100-140 degrees F.), some processes such as cold smoking require a very low constant temperature of below 105 degrees F. It is very important to eliminate spikes in temperature when cold smoking. It is known that the smoke generating materials contribute a significant amount of heat to the process. While venting and the like may help control temperature, it is even more desirable to eliminate heat spikes altogether.

Many machines and devices have been developed to generate smoke in a cooking environment. Some examples include:

U.S. Pat. No. 7,900,553 to Maurin is titled Apparatus for Cooking Using Wood Pellets. This patent shows an apparatus for cooking using wood pellets comprising: a direct cooking zone; an indirect cooking zone separated from the direct cooking zone by a divider; and a wood pellet burner positioned in the direct cooking zone such that food items in the direct cooking zone will be positioned above the burner. The cooking apparatus has a combustion flow path such that combustion gas from the burner will flow upwardly in the direct cooking zone, then over the divider, and then downwardly into the indirect cooking zone. The downward flow of combustion gas into the indirect cooking zone provides a top down cooking mode for food products placed therein.

U.S. Pat. No. 6,763,932 to Stenson et al. is titled Particulate Material Handling Systems. It shows a system comprises a tube, an endless belt that passes through the tube and returns outside of the tube, and a flighting that is suspended a predetermined distance from the belt through the entire length of the tube. The distance may be varied for the various materials being handled. An intake hopper is mounted at one end of the tube for receiving the material to be moved and a discharge spout is mounted at the other end of the tube for discharging the material from the tube. The endless belt and flighting are driven such that their speed may be varied and such that their relative speeds are synchronized to drive the material at substantially the same speed whether it is being carried by the belt or the flighting. The combination of the belt and the flighting drives the material through the tube, minimizing damage to the material, which may be granular fertilizer, pulse crops, grains or other particulate material.

U.S. Pat. No. 6,533,105 to Dutschke is titled Grain Augers and the Like. The invention relates to a material conveying assembly of the kind comprising an outer tubular casing and a rotary feed screw mounted within the casing on a tubular drive shaft, wherein the intake end of the auger is provided with a replacement intake auger sub-assembly comprising flexible helical flighting freely rotatably mounted on a drive shaft extension which is connected to the main drive shaft and a clutch device which drivingly connects the intake flighting shaft portion to the drive shaft extension. The clutch device is arranged so that it will automatically disengage drive to the shaft portion in the event of an overload occurring. A soft pliable extension sleeve is co-axially fitted over the open leading end of the outer casing and is arranged to encircle a portion of the intake flighting. The extension sleeve being easily deformable, in combination with the resilient flexible flighting significantly reduces the likelihood of any injury being suffered by an operator in the event of one of his or her limbs being caught in the intake flighting.

U.S. Pat. No. 6,223,737 to Buckner is titled Pellet Fuel Burning Device. It shows a pellet fuel burner, such as a cooking grill, has a fire box with a generally open top plane. A pellet burner unit is disposed in the fire box below the cooking surface. A pellet feeding device opens into the fire box and is disposed so as to feed pellets into the burner unit. A pressure box has an inlet supplied with combustion air at a positive pressure. A plurality of outlets are provided in the pressure box and disposed so as to create a turbulent combustion air flow in the pellet burner unit. The outlets may include a first outlet disposed above the burner unit and a second outlet disposed below the burner unit. The turbulent combustion air flow and supply of pellets, particularly corn kernels from the pellet feeding device allow for a continuous sustained combustion of the fuel in the pellet burner.

U.S. Pat. No. 4,823,684 to Traeger et al. is titled Pellet-Fired Barbecue. It shows a pellet-fired barbecue including an elevated barbecue pan fired by a pellet-burning pot mounted below the bottom of the barbecue. A heat baffle plate is disposed within the pan above the top of the pot, and forced-air mechanism produces movement of hearted air within the barbecue.

U.S. Pat. No. 652,531 to Carlson is titled Smoke Device for Curing Meats. This patent shows a conveyor to advance saw dust through a fuel tube.

While each of these may work well for their intended purposes, they each can nevertheless be improved upon.

For example, it is desired to have a feed that has a spring (or flights) that terminate a selected distance in advance of an opening wherein the material could even out before falling through the opening.

Further, it is desired to have a feed that is adjustable to accommodate smoking materials of different sizes, for example saw dust and wood chips.

Still further, it is desired to generate sufficient smoke without heat spikes that can occur when smoke generating materials are added in an ineffective manner, such as in an unpredictable manner or with insufficient air within the burn chamber.

Thus there exists a need for an improved feed mechanism of a smoke generating device that solves these and other problems.

SUMMARY OF THE INVENTION

The present invention relates to an improved feed mechanism of a smoke generating device, and in particular to a feed mechanism having an adjustable auger that allows smoke generating materials of selected sizes to fall from a deposit tube in an improved manner. According to one advantage of the present invention, the feed mechanism has a bin with opposed sides, the first of which having a smokehouse mount with an air hole therein and the second side having a motor mount thereon. A tube extends from the smokehouse mount. An auger is adjustably received within the tube to advance material from the bin to a hole in the tube at the opposite end of the auger. Bearings are provided for allowing the height of the auger within the tube to be adjusted to accommodate smoking materials of a selected size.

According to one advantage of the present invention, the tube has an internal diameter that is larger than the outer diameter of the coil of the auger. This advantageously allows the location of the auger to be adjusted within the tube to vary the distance between the auger and the bottom of the tube. Accordingly, the user can adjust the feed mechanism for use with different size smoke generating materials.

This can be advantageously accomplished in one embodiment with the use of set screws to rotationally fix a bearing with an offset retainer at the desired location.

According to another advantage of the present invention, the auger has a shaft with a coil or other structure that terminates short of the opening in the delivery tube. Advantageously, the materials being fed through the delivery tube fall to the bottom of the tube before falling out of the tube opening onto a burn plate. The material is therefore predictably distributed onto the feed plate.

One advantage of the predictable and even distribution of deposited smoke materials is that it eliminates the need to constantly rake or smooth out the burn plate. Flooding is thereby eliminated, which eliminates undesirable temperature spikes.

Smoke output is maintained or increased without increasing temperature as a result of the present invention. A constant low temperature is therefore achieved allowing for superior operating and smoking conditions. This can be achieved by having the materials be distributed in predictable manner and having sufficient air flow within the burn chamber.

Other advantages, benefits, and features of the present invention will become apparent to those skilled in the art upon reading the detailed description of the invention and studying the drawings.

DETAILED DESCRIPTION OF PREFERRED EMBODIMENTS

Figure 1:
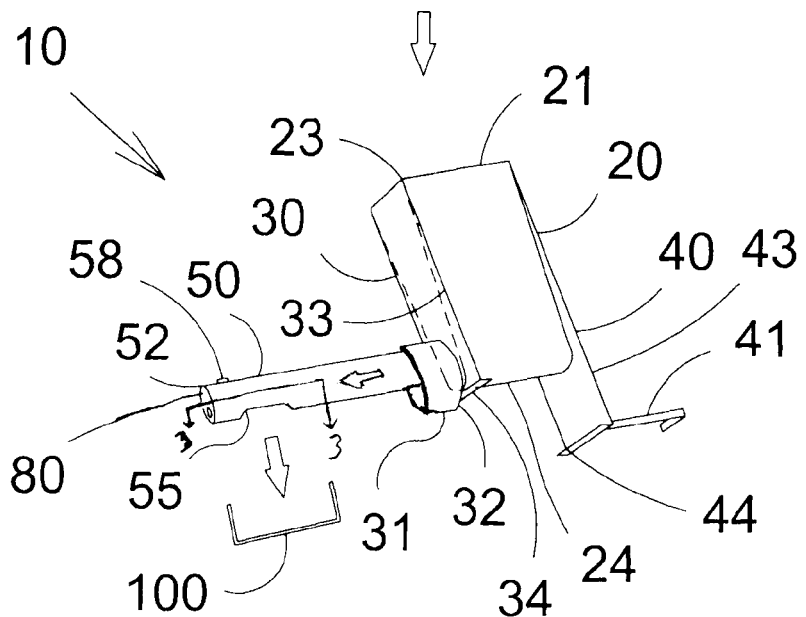
FIG. 1 is a perspective view of a preferred embodiment of the present invention.
Figure 2:
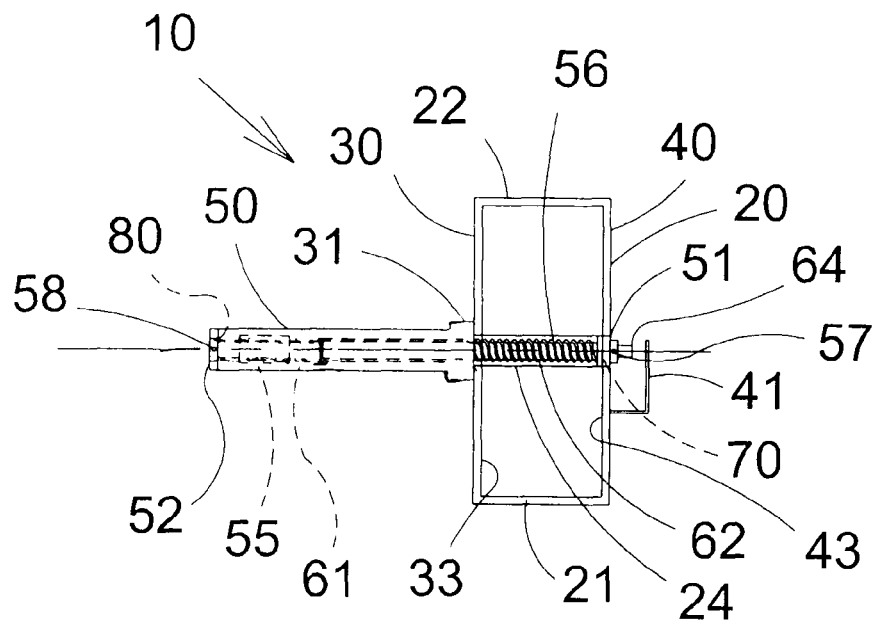
FIG. 2 is a top view of the embodiment illustrated in FIG. 1.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Turning now to FIGS. 1-10, it is seen that a preferred embodiment of a feed mechanism 10 is provided. The feed mechanism can be made of any suitable material that is strong and durable in high temperature environments.

It will be readily understood that while several preferred dimensions are described herein, that such dimensions are illustrative only and that the dimensions may vary without departing from the broad aspects of the present invention.

The feed mechanism 10 has a bin 20 having opposed ends 21 and 22. Ends 21 and 22 diverge at the top 23 of the bin 20, and converge at the bottom 24 of the bin. The bottom 24 is preferably rounded and can form an integral portion of a tube (described below). A cover (not shown) can be provided for covering the bin 20.

A first side 30 is provided, as is an opposed side 40. Each side plate has an inwardly facing right angle bend or lip at their respective bottoms, as described below.

Side 30 further has a smokehouse mount 31 mounted on its outside. The mount 31 has a generally circular shaped profile. Mount 31 can be slid into or otherwise received within an opening in a standard chamber (not shown) wherein the tube (described below) can extend into the burn chamber and the bin 20 can be held outside of the chamber. One preferred outside diameter of the mount is approximately 3 inches. The hanger can have a preferred length of approximately 2 inches. The bottom of the mount extends below the bottom of side 30 (and lip 34 in particular) creating an opening 32 to allow air to enter the smokehouse chamber. Hole 32 allows air to enter the smokehouse chamber outside of the tube (described below). Side 30 has a preferably generally rectangular plate 33 with a bottom lip 34 that is inwardly facing. The lip 34 preferably spans the width of the plate 33.

Side 40 has a motor holder 41 thereon. The holder is preferably a bracket that can accommodate a motor to operate the auger (described below). Side 40 comprises a plate 43 with an inwardly facing lip 44. Lip 44 preferably spans the width of the plate 43.

It is understood that lips 34 and 44 are useful in the manufacturing process to enable the mechanism 10 to be handled for processes such as welding and the like.

In a preferred embodiment, the bin (at the top 23) is about 4 inches between sides 30 and 40 and about 8 inches between the ends 21 and 22.

Side plates 33 and 43 are preferably parallel to each other, wherein the bin depth is preferably constant. Sides 30 and 40, and ends 21 and 22 all have tops that preferably end in the same plane defining the top 23 of the bin 20.

A delivery or deposit tube, or simply tube, 50 is further provided. The tube 50 can have and end 51 on side 40 of the bin. A second end 52 projects a selected distance from side 30. Tube 50 preferably has a generally circular profile having a selected interior diameter. One preferred inside diameter is approximately 1.5 inches, and one preferred outside diameter is approximately 1.75 inches.

The tube has a generally rectangular opening or hole 55 through the bottom adjacent end 52. Materials advanced to the opening can fall through the opening and onto a burn plate 100. It is further appreciated that the tube is open to the bottom of the bin 20 with an elongated opening 56. In the illustrated embodiment, the bin 20 forms an integral portion of the tube 50, wherein the tube has a first section between the bin 20 and end 51, and a second section between the bin and end 52. It is understood that tube may be constructed by adding a sections of round pipes to both sides of the bin 20 to form the tube 50.

Tube 50 preferably extends from the side and passes through the smokehouse mount 31. It is preferred that the tube 50 is at the top of the smokehouse mount, has a longitudinal axis that is parallel to but offset from the smokehouse mount 31 longitudinal axis. It is understood that air hole 32 is preferably located below tube 50, but could be located in other locations relative the tube 50 without departing from the broad aspect of the present invention.

A nut 57 is adjacent end 51 of the tube, and a nut 58 is adjacent end 52. The nuts 57 and 58 are concentric with holes formed in the tube 50. Each nut is threaded to receive a screw 59. The screws have a head that is engaged outside of the tube 50 to selectably move the body into or out from the tube.

Figure 3:
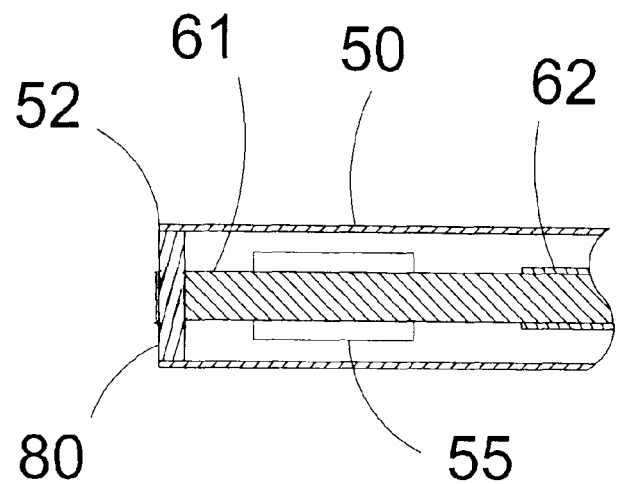
FIG. 3 is a cross-sectional view taken along line 3-3 in FIG. 1.
Figure 4:
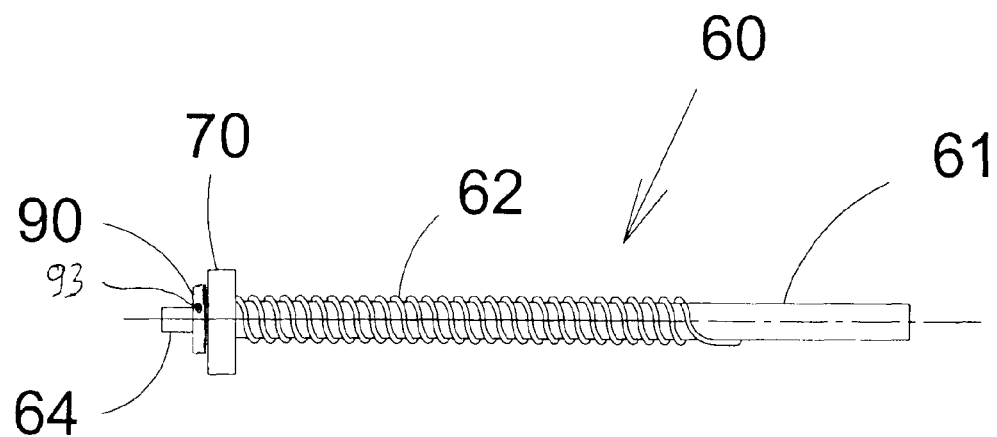
FIG. 4 is a side view of a preferred auger with a preferred bearing and collar attached thereto.
Figure 5:
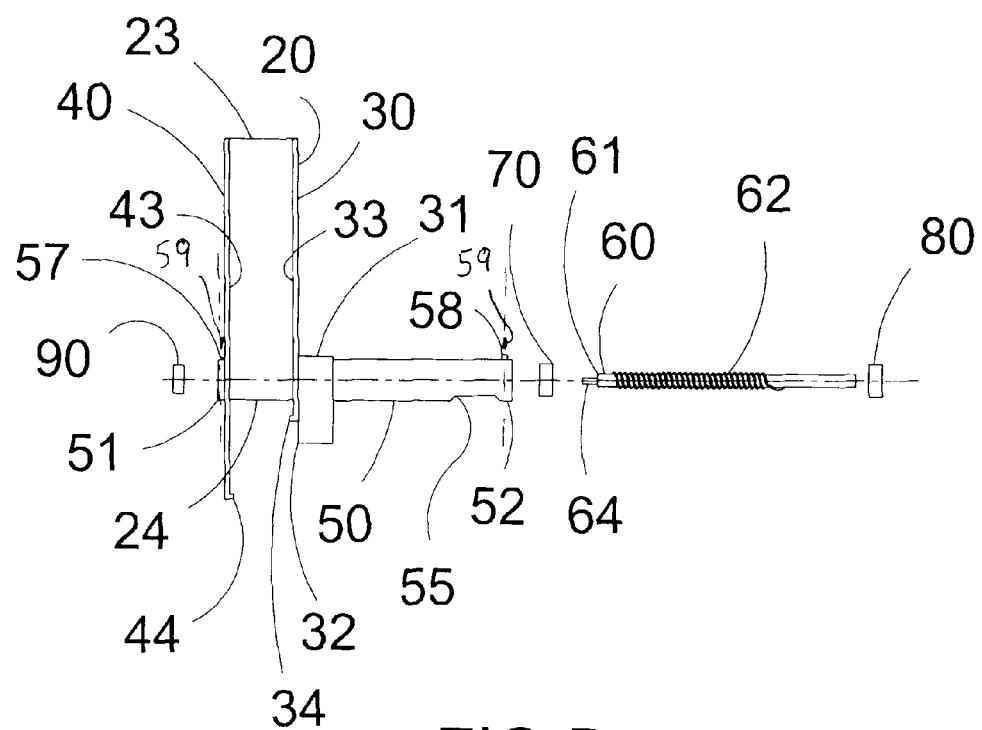
FIG. 5 is a side exploded view of the embodiment illustrated in FIG. 1.
Figure 6:
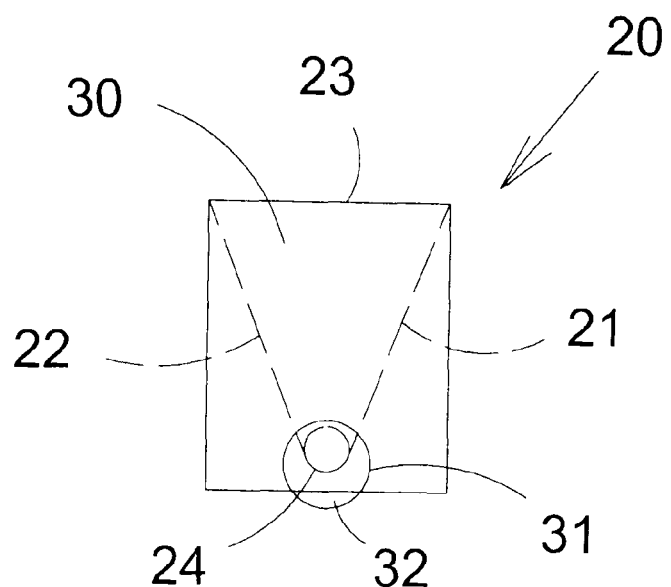
FIG. 6 is an end view of the bin illustrated in FIG. 1.

Auger 60 has a shaft 61 and an advancing member such as a coil 62. The coil, illustrated as a preferred embodiment, extends from a portion near one end a selected distance towards the opposite end, as best seen in FIG. 3. The shaft is preferably round (preferably about ½ inch diameter) along a majority of its length. However, it is preferably square at one end 64. It is appreciated that a coil is but one of any suitable structures and that modifications may be made without departing from the broad aspects of the present invention. For example flights or other structures could be used to advance materials without departing from the broad aspects of the present invention. Coil 62 preferably starts inward from the square end 64 of the shaft approximately 2 and ¼ inches and ends approximately 4 inches from the opposite end. In this regard, when assembled, the coil preferably 62 terminates about 2 inches short of opening 55.

The coil has an outer diameter that is smaller than the inside diameter of the tube 50. In this regard, the location of the auger 60 relative the tube 50 can be adjustable by the user.

Figure 7:
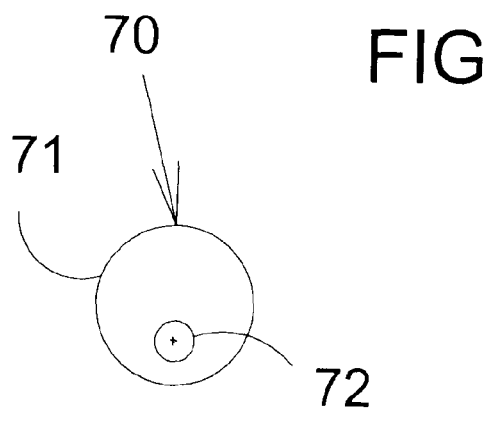
FIG. 7 is a side view of a preferred bearing of the present invention.
Figure 8:
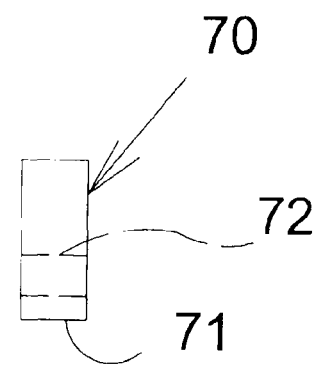
FIG. 8 is an end view of the bearing illustrated in FIG. 6.

A bearing 70 is provided, and is best illustrated in FIGS. 7 and 8. Bearing 70 has a perimeter 71 that is round. The bearing 70 preferably has an outer diameter of approximately 1.5 inches. A retainer 72 that is offset from the center of the bearing 70 is also provided. The retainer 72 is preferably a round opening (diameter preferably about ½ inch) passing completely through the bearing at a location preferably approximately ¼ inch from the outer perimeter of the bearing. The round opening has a longitudinal axis that is parallel to but offset from a bearing axis. The retainer 72 is designed to loosely engage the shaft 61 when assembled, allowing the shaft to rotate relative the bearing. The bearing 70 can be fixed to the tube end 51 with a set screw 59 or other suitable fastener held by nut 57. It is appreciated that the bearing can be rotated within the tube 50 (prior to being locked) whereby the retainer 72 position can be adjusted to any selected portion along its orbital path within the tube. This advantageously allows coil 62 to be a predetermined height above the bottom of the tube whereby materials of any desired size can be fed through the feed mechanism 10.

A bearing 80 is further provided. Bearing 80 is similar to bearing 70. Bearing 80 can be removably received within the tube 50 at end 52.

Figure 9:
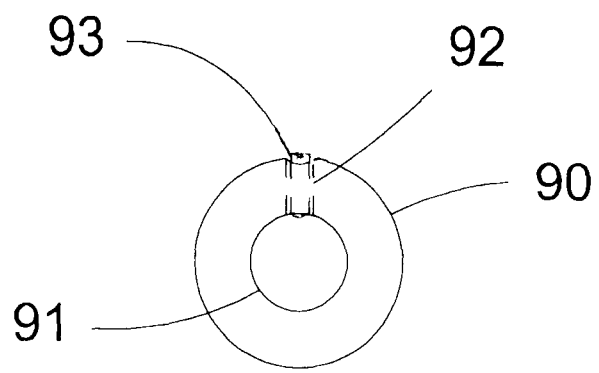
FIG. 9 is an end view of a preferred collar of the present invention.
Figure 10:
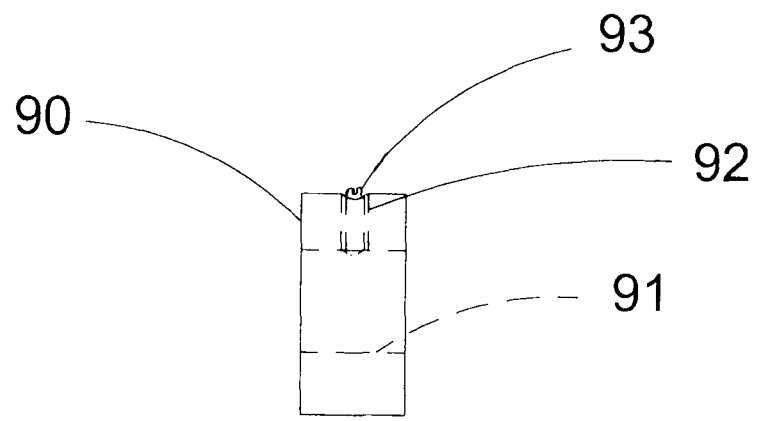
FIG. 10 is a side view of the preferred collar shown in FIG. 9.

A collar 90, as best seen in isolation views FIGS. 9 and 10, can be locked onto the shaft 61 to hold the auger longitudinally in place within the tube 50. Collar 90 has a centrally located hole 91 passing through the collar that can receive the shaft of the auger. The collar hole 91 is preferably about ½ inch in diameter. A threaded hole 92 for receiving a set screw 93 is further provided. Hole 92 is preferably generally perpendicular to hole 92. The collar 90 is lockable on the shaft by advancing the screw 93 through hole 92 to engage the shaft 61, thereby forcing bearing 70 to remain between the collar 90 and the coil 62 of the auger 60.

In use, the height of the auger, and in particular the coil 62, relative the bottom 24 of the bin and the tube 50 is determined by the angular rotation of the bearings 70 and 80. It is appreciated that bearing 70 and 80 are independently adjustable to determine the respective height of the ends of the auger 60 relative the tube 50.

The motor (not shown) preferably engages the square end 64 of the auger 60 to cause it to rotate at a selected rate. The coil 62 advances smoke generating material from the bin 20 laterally down tube 50. The coil 62 terminates prior to the tube opening 55. During the distance of tube between the coil 62 and the opening 55, the smoke generating material falls from the sidewall of the tube and becomes centered on the bottom of the tube. Hence, when it is forced by additional material to the opening, it falls predictably from the center of opening 55 and onto the burn plate 100. The motor can cause the shaft to rotate at a constant rate, wherein smoke generating material is slowly, constantly and evenly distributed onto the burn plate. In this regard, the smoke output and operating temperatures can be constantly maintained.

Thus it is apparent that there has been provided, in accordance with the invention, an improved feed mechanism of a smoke generating device that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A feed mechanism for advancing a material to a smokehouse, said feed mechanism comprising:
   a bin;
   a tube having a tube inside and a tube inside diameter, said tube further having a tube first end and a tube second end;
   an auger for advancing the material from said bin to a location inside the smokehouse, wherein said auger is adjustable relative said tube, wherein said auger is adjustable in location relative said tube at both of said tube first end and said tube second end; and
   a bearing, said bearing adjusting the location of said auger relative said tube, wherein said bearing comprises a perimeter that is generally round and a retainer that is generally round, said retainer being offset from a center point of said bearing.

2. The feed mechanism of claim 1 wherein:
   said bearing is rotatably received within said tube;
   rotation of said bearing causes said retainer to move within the tube whereby said auger is likewise moved within said tube; and
   said tube has a nut for receiving a screw to lock said bearing in a selected rotational orientation within said tube.

3. The feed mechanism of claim 1 wherein said auger comprises a shaft and a coil, and said tube comprises a bottom having an opening there through, said coil advancing the material towards said opening as said auger rotates within said tube.

4. The feed mechanism of claim 3 wherein said coil stops short of said opening.

5. The feed mechanism of claim 4 further comprising a collar.

6. The feed mechanism of claim 5 wherein said collar comprises a centrally located hole and a threaded hole perpendicular to said centrally located hole, said threaded hole adapted to receive a screw to lock said collar onto said auger.

7. The feed mechanism of claim 6 wherein said collar locks said bearing into position on said auger.

8. The feed mechanism of claim 7 wherein said auger comprises a square end.

9. The feed mechanism of claim 8 wherein said collar is locked on said auger adjacent said square end.

10. The feed mechanism of claim 1 further comprising a mount, said mount being parallel to but with a larger diameter than said tube, said mount having an area outside of said tube with an air hole for allowing an amount of air to enter the smokehouse.

11. A feed mechanism for advancing a material to a smokehouse, said feed mechanism comprising:
a bin;
a tube having a tube inside and a tube inside diameter, said tube being a generally round tube and having an opening therein for allowing the material to fall into the smokehouse; and
an auger for advancing the material from said bin to said opening, said auger having an advancing member around a shaft a selected distance terminating a predetermined distance in front of said opening, wherein the material that is advancing can become centered within said tube prior to falling through said opening,
wherein said advancing member is a coil that is wrapped around said shaft and terminates approximately 2 inches in front of said opening.

12. The feed mechanism of claim 11 further comprising:
a first bearing; and
a second bearing,
wherein said first bearing and said second bearing are held in a fixed rotational orientation within said tube to adjust the location of said auger with respect to said tube.

13. The feed mechanism of claim 11 further comprising a mount, said mount being parallel to but with a larger diameter than said tube, said mount having an area outside of said tube with an air hole for allowing air to enter the smokehouse.

14. A feed mechanism for advancing a material to a smokehouse, said feed mechanism comprising:
a bin;
a tube having a tube inside and a tube inside diameter, said tube having an opening therein for allowing the material to fall into the smokehouse;
an auger for advancing the material from said bin to said opening, and
a mount, said mount being parallel to but with a larger diameter than said tube, said mount having an area outside of said tube with an air hole for allowing an amount of air to enter the smokehouse outside of said tube.

15. The feed mechanism of claim 14 further comprising:
a first bearing; and
a second bearing,
wherein said first bearing and said second bearing are held in a fixed rotational orientation within said tube to adjust the location of said auger with respect to said tube.

16. The feed mechanism of claim 14 wherein said auger has an advancing member around a shaft a selected distance terminating approximately 2 inches in front of said opening, wherein the material that is advancing can become centered within said tube prior to falling through said opening.

17. A feed mechanism for advancing a material to a smokehouse, said feed mechanism comprising:
a bin;
a tube having a tube inside and a tube inside diameter, said tube further having a tube first end and a tube second end;
an auger for advancing the material from said bin to a location inside the smokehouse, wherein said auger is adjustable relative said tube, wherein said auger is adjustable in location relative said tube at both of said tube first end and said tube second end;
a bearing, said bearing adjusting the location of said auger relative said tube and
a collar, wherein said collar comprises a centrally located hole and a threaded hole perpendicular to said centrally located hole, said threaded hole adapted to receive a screw to lock said collar onto said auger.

18. A feed mechanism for advancing a material to a smokehouse, said feed mechanism comprising:
a bin;
a tube having a tube inside and a tube inside diameter;
an auger for advancing the material from said bin to a location inside the smokehouse, wherein said auger is adjustable relative said tube; and
a mount, said mount being parallel to but with a larger diameter than said tube inside diameter, said mount having an area outside of said tube with an air hole for allowing an amount of air to enter the smokehouse.

19. A feed mechanism for advancing a material to a smokehouse, said feed mechanism comprising:
a bin;
a tube having a tube inside and a tube inside diameter, said tube being a generally round tube and having an opening therein for allowing the material to fall into the smokehouse;
an auger for advancing the material from said bin to said opening, said auger having an advancing member around a shaft a selected distance terminating a predetermined distance in front of said opening, wherein the material being advanced can become centered within said tube prior to falling through said opening;
a first bearing; and
a second bearing,
wherein said first bearing and said second bearing are held in a fixed rotational orientation within said tube to adjust the location of said auger with respect to said tube.

20. A feed mechanism for advancing a material to a smokehouse, said feed mechanism comprising:
a bin;
a tube having a tube inside and a tube inside diameter, said tube being a generally round tube and having an opening therein for allowing the material to fall into the smokehouse;
an auger for advancing the material from said bin to said opening, said auger having an advancing member around a shaft a selected distance terminating a predetermined distance in front of said opening, wherein the material being advanced can become centered within said tube prior to falling through said opening; and
a mount, said mount being parallel to but with a larger diameter than said tube, said mount having an area outside of said tube with an air hole for allowing an amount of air to enter the smokehouse.

* * * * *